(12) United States Patent
Wellwood et al.

(10) Patent No.: US 7,981,233 B2
(45) Date of Patent: Jul. 19, 2011

(54) METHOD OF FORMING A BAMBOO WOOD COMPOSITE BOARD

(75) Inventors: Rob Wellwood, Edmonton (CA);
Qisheng Zhang, Edmonton (CA);
Shenxue Jiang, Edmonton (CA);
Liheng Chen, Edmonton (CA)

(73) Assignee: Alberta Innovates—Technology Futures, Edmonton, Alberta (CA)

( * ) Notice: Subject to any disclaimer, the term of this patent is extended or adjusted under 35 U.S.C. 154(b) by 0 days.

(21) Appl. No.: 12/816,098

(22) Filed: Jun. 15, 2010

(65) Prior Publication Data

US 2010/0252181 A1    Oct. 7, 2010

Related U.S. Application Data

(62) Division of application No. 10/927,942, filed on Aug. 27, 2004, now abandoned.

(51) Int. Cl.
*B32B 37/18*    (2006.01)
(52) U.S. Cl. ........ 156/182; 144/329; 144/346; 144/352; 156/60; 428/98; 428/105; 428/106; 428/114; 428/188; 428/532; 428/535; 428/537.1
(58) Field of Classification Search ............... 428/105, 428/98, 114, 188, 106, 535, 537.1, 532; 156/60, 156/182; 144/329, 346, 352
See application file for complete search history.

(56) References Cited

U.S. PATENT DOCUMENTS

| 4,743,484 A | 5/1988 | Robbins |
| 4,810,551 A | 3/1989 | Chu |
| 5,506,026 A | 4/1996 | Iwata et al. |

FOREIGN PATENT DOCUMENTS

| CN | 1100985 A | * | 4/1995 |
| CN | 1275481 A | * | 12/2000 |

OTHER PUBLICATIONS

Deka, M. et al.; Studies on Dimensional Stability, Thermal Degradation and Terrible Resistant Properties of Bamboo (Bambusa tulda Roxb.) Treated with Thermosetting Resins; Journal of Bamboo and Rattan; 2003; vol. 1, No. 1; pp. 29-41.

Anwar, U.M.K. et al.; Effect of Curing Time on Physical and Mechanical Properties of Phenolic-Treated Bamboo Strips; Science Direct; 2009; vol. 29; pp. 214-219; Elsevier.

* cited by examiner

*Primary Examiner* — Brent T O'Hern
(74) *Attorney, Agent, or Firm* — Bennett Jones LLP

(57) ABSTRACT

A method of forming a board suitable for use as container flooring uses bamboo and fast-growth low-density wood. The method includes the step of overlaying thin layers of high-density bamboo composites on surfaces of a core layer which can be the composite of wood veneer and wood strand-based composite, or wood veneer and bamboo stripe sheet composite. The benefits of bamboo and wood materials are combined to produce a bamboo-wood composite board having sufficient mechanical and physical strength and durability for use as container flooring.

6 Claims, 2 Drawing Sheets

METHOD OF FORMING A BAMBOO WOOD COMPOSITE BOARD

CROSS REFERENCE TO RELATED APPLICATIONS

This application is a divisional application of U.S. patent application Ser. No. 10/927,942 filed on Aug. 27, 2004 entitled "Container Flooring Material and Method of Manufacture".

BACKGROUND OF THE INVENTION

The present invention relates to a composite board suitable for use as a container flooring material.

Container shipping revolutionized the shipping industry in the 1950's. A container body could be moved from a tractor-trailer and placed it fully-loaded on a ship, a railroad car, or even an airplane. Ocean shipping in this manner saves the tedious, expensive, and time-consuming job of unloading cargo from a truck or a railroad car, loading it into the hull of a ship and reversing the process at the ship's destination. A standard container can carry up to 20 tons (U.S.) fully loaded. It can keep shipments together, protect them from the elements, from damage in handling, and from theft. An estimated 90 percent of the world's trade today moves in containers.

The floorboard of the container is the main structural component to carry the cargo loading. Container flooring must meet high requirements for mechanical performance, impact resistance, and durability. For many years, the container industry has relied on high-density hardwood species from the tropical forest to produce the multiple-layer thick plywood as container floorboards. However, tropical high-density hardwood species such as Apitong and Keruing face increasing demand while having very long growth cycles. As a result, tropical hardwood forests are rapidly diminishing.

To protect the natural environment and decrease the consumption of tropical hardwood, it would be desirable to develop a new type of container flooring with a more environmentally-friendly species to expand the floorboard supply and meet the increasing demand of the container industry.

SUMMARY OF THE INVENTION

The present invention relates to a novel wood composite material suitable for use as container flooring. Rather than using tropical hardwood species, the present invention utilizes fast growing bamboo species, as well as fast-growing low-density wood species such as poplar or aspen.

Therefore, in one aspect of the invention, the invention may comprise a bamboo-wood composite board comprising: (a) at least one surface layer comprised of a plurality of bamboo stripe sheets and resin;(b) a core layer comprising at least one wood veneer layer and a support layer.

The support layer may comprise a wood-strand layer or it may comprise another wood veneer layer. If there are more than one wood veneer layer, preferably the grains of the layers are disposed perpendicularly.

In another aspect, the invention may comprise a bamboo-wood composite board comprising:(a) at least one surface layer comprised of a plurality of bamboo stripe sheets and a resin;(b) a core layer comprising a wood strand layer.

In another aspect, the invention may comprise a method of forming a bamboo-wood composite board, comprising the steps of:

(a) forming a surface layer of bamboo stripe sheets and resin, and hot-pressing the surface bamboo layer;

(b) forming a core layer comprising at least one wood veneer layer and a support layer, wherein the support layer comprises a wood strand layer; and (c) pressing the surface bamboo layer and the core layer together to form the composite board.

DETAILED DESCRIPTION

When describing the present invention, all terms not defined herein have their common art-recognized meanings. As used herein, the term "about" refers to a margin of plus or minus 10%, or within the tolerance of a suitable measuring device or instrument. As used herein, "specific density" refers to density relative to water. All wood density refers to the density of oven-dried wood.

The present invention relates to a bamboo-wood composite board suitable for use as a container flooring material. In general terms, the invention comprises a multilayer board having a surface composite bamboo layer and a wood core layer. The wood core layer may be comprised of a wood veneer layers or a wood strand layer, or both wood veneer and wood strand layers. The wood core layer, including any wood veneer layer or wood strand layer, continuously extends the entire width of the board.

The bamboo layer comprises bamboo stripe sheets made of strips of bamboo and a suitable resin. The bamboo strips may be arranged so that the bamboo strips are all parallel, or parallel and perpendicular combination, or they may be layered or woven in a crisscrossing pattern. The bamboo strip sheets are pressed into a thin high density bamboo layer which preferably has a specific density of at least about 0.9.

The wood core layer may comprise wood veneers in either grain parallel or grain perpendicular orientation or in alternating parallel and perpendicular layers. As used herein, "grain parallel" refers to wood grain which is parallel to the longitudinal axis of the board. "Grain perpendicular" refers to wood grain which is perpendicular the longitudinal axis of the board. As well, or alternatively, the wood core layer may comprise a wood strand layer, which comprises wood strand chips similar to those suitable for use in oriented strand boards. The wood strand layer may be oriented or non-oriented.

The wood core layer, either wood veneers or wood strand, or both a wood veneer and a wood strand layer, may preferably be comprised of any suitable low-density wood. Low density wood has a specific density of about 0.6 or less. Suitable wood species may include poplar, aspen, spruce, fir and pine. Preferably, the wood species is a fast growing species which may provide a plentiful and low-cost supply.

Figure 1:
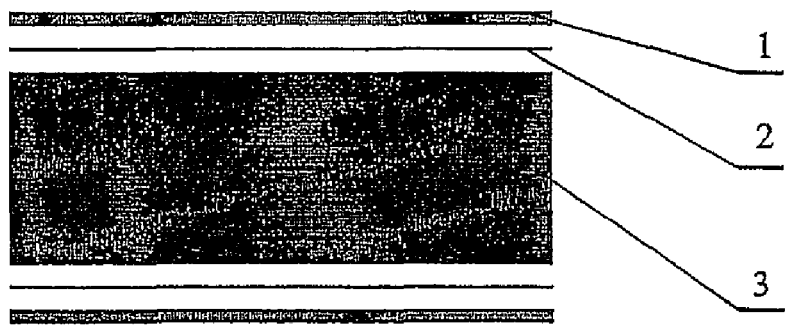
FIG. 1 shows one embodiment of the invention in cross-section. The floorboard has a core layer composed of wood veneer and strand-based wood composite. Item (1) is the surface layer of thin high-density bamboo composite; Item (2) is the poplar or other wood species veneer in the parallel direction; and Item (3) is the strand-based wood composite.

In one embodiment, the invention comprises a wood composite material comprising bamboo and a low-density wood species as raw materials. As shown in FIG. 1, the material includes at least one surface layer (1) of thin high-density bamboo composites and a core layer of a wood strand layer (3). Optionally, a buffer layer of a wood veneer (2) may be disposed between the bamboo surface layer (1) and the wood strand layer. In one embodiment, the surface layer of thin high-density bamboo composite (1) is bonded to a wood species veneer (2) such as a poplar veneer in the parallel or perpendicular direction and a strand-based wood composite layer (3), which may or may not be oriented.

The bamboo composite may be formed by processing bamboo culms into bamboo stripe sheets and hot-pressing the resinated bamboo stripe sheets into thin high-density bamboo composites. The wood veneers and strand-based wood composites may be formed using techniques well-known to those skilled in the art.

In one example, the bamboo culms are processed into bamboo stripes and woven into bamboo stripe sheets. About 3 to 7 layers of these bamboo stripe sheets may be resinated with a suitable mixture of phenol-formaldehyde resin and insecticide and then conditioned and dried. These bamboo stripe sheets are then formed them into a mat which is hot-pressed with the press temperature of about 135 to about 145° C. and press pressure of about 4.0 to about 4.5 MPa for about 6 to about 10 minutes. Preferably, the press pressure is gradually reduced for degassing or the press cooled with cold water. Resin may then be applied to the surface of the bamboo composite layer for the next step.

Poplar log may be processed into strands, such as those strands suitable for oriented strand board (OSB) and pressed into the strand-based composite with or without orientation The wood strand layer may then be sanded to the target thickness for the core layer (3).

The middle wood veneer layer may be a poplar veneer layer having a thickness of between about 1.0 to about 2.0 mm and a moisture content less than about 8%. Both sides of the veneer are coated with resin (the resin is mixed with the insecticide) at a loading rate of about 300 to 400 g/m². The veneers may then be conditioned and dried.

Using the thin high-density bamboo composite as the surface layer (1), the wood strand-based composite as the core layer (3), and a layer of wood veneer between them (2) to form the mat, the mat is then pressed with press temperature of about 135 to about 145° C. and press pressure of about 1.5 to about 3.0 MPa for 10 to 18 minutes while gradually reducing the press pressure for degassing or cooling the press with cold water.

The mechanical and physical properties of the resulting floorboard are:
MOR in parallel direction: ≧80 MPa
MOR in perpendicular direction: ≧30 Mpa
MOE in parallel direction: ≧10,000 MPa
MOE in perpendicular direction: ≧3,000 Mpa
Panel density: 0.75 to 0.85 g/cm³

In an alternative embodiment, the bamboo composite layers, the wood veneer and the wood strand layers may be pressed without prepressing the bamboo layer. This method may reduce the processing time however; it may be more difficult to control the density of the bamboo layer consistently.

Figure 2:
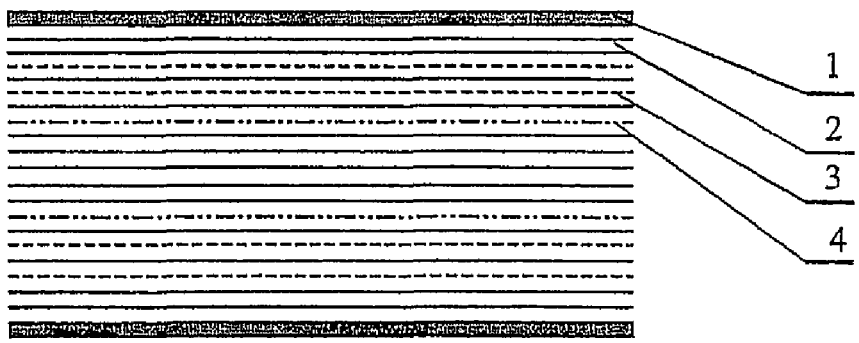
FIG. 2 shows another embodiment of the invention in cross-section. The floorboard has a core layer composed of wood veneer and bamboo stripe sheets. Item (1) is the surface layer of thin high-density bamboo composite; Item (2) is the wood veneer in the parallel direction; Item (3) is the wood veneer in the perpendicular direction; and Item (4) is the bamboo stripe sheet in the perpendicular direction.

In another embodiment as shown schematically in FIG. 2, the floorboard comprises surface bamboo stripe sheets and a core layer composed of wood veneers and bamboo stripe sheets. The surface layer of thin high-density bamboo composite (1) is bonded to a wood veneer (2) in the parallel direction, a wood veneer in the perpendicular direction (3), and a bamboo stripe sheet in the perpendicular direction (4).

In one example, the thin high density bamboo composites may be formed as described above. A poplar veneer as described above is coated on both sides with resin loaded at about 300 to 400 g/m² may then be conditioned and dried.

The floorboard may then be formed using two layers of thin high-density bamboo composites as surface layers (1), two layers of bamboo stripe sheets as the fortified layers (4), and seventeen layers of wood veneers as the core layer, preferably with alternating grain direction, (2) to form the mat with a structure of twenty-one layers. The mat furnish is then pressed with press temperature of 135 to 145° C. and press pressure of 2.0 to 3.0 MPa for 35 to 40 minutes, gradually reducing the press pressure for degassing or cooling the press with cold water, and opening the press for the final product.

The mechanical and physical properties of the resulting floorboard are:
MOR in parallel direction: ≧80 MPa
MOR in perpendicular direction: ≧30 Mpa
MOE in parallel direction: ≧10,000 MPa
MOE in perpendicular direction: ≧3,000 Mpa
Panel density: 0.70 to 0.85 g/cm³

Figure 3:
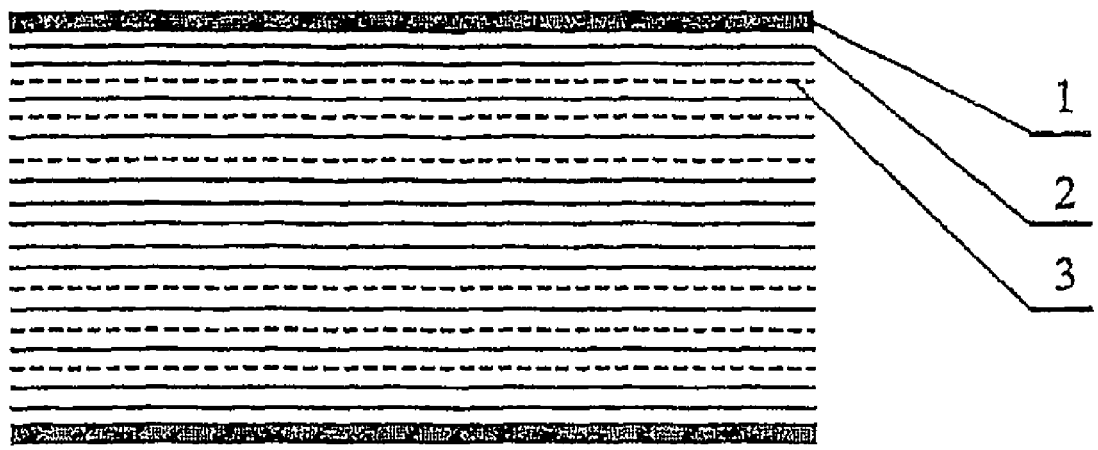
FIG. 3 shows another embodiment of the invention in cross-section. The floorboard has a core layer composed of wood veneer. Item (1) is the surface layer of thin high-density bamboo composite; Item (2) is the wood veneer in parallel direction; and Item (3) is the wood veneer in perpendicular direction.

In another embodiment shown schematically in FIG. 3, the floorboard comprises a core layer (2, 3) composed of wood veneers running in both parallel and perpendicular directions and a surface layer of thin high-density bamboo composite (1).

The bamboo stripe sheets and the thin high-density bamboo composite may be formed as described above. As well, the wood veneers are also formed as described above. Resin is applied to the both sides of the poplar or Chinese red pine veneers whose moisture content is less than 8% and thickness is between 1.0 to 2.0 mm (the resin is mixed with the insecticide), loaded at 300 to 400 g/m², followed by conditioning and drying.

Using two layers of thin high-density bamboo composites as the surface layers (1), and seventeen layers of poplar or Chinese red pine veneers as the core layer to form the mat with a structure of nineteen-layers as shown in FIG. 3, the mat furnish is pressed with press temperature of 135 to 145° C. and press pressure of 2.0 to 3.0 MPa for 35 to 40 minutes. Again, the press pressure is preferably gradually decreased for degassing or the press cooled with cold water.

The mechanical and physical properties of the resulting floorboard are:
MOR in parallel direction: ≧80 MPa
MOR in perpendicular direction: ≧30 Mpa
MOE in parallel direction: ≧10,000 MPa
MOE in perpendicular direction: ≧3,000 Mpa
Panel density: 0.70 to 0.85 g/cm³

Without being restricted to a theory based on the mechanical theory of the composite material, it is believed that the contribution to the entire MOE of individual layer in the symmetrical multiple-layer structure is in proportion to its MOE to the third power of its distance to the central plane. Accordingly, the layer with the high MOE will have a higher contribution to the overall MOE of the structure when it is located in the outer region (i.e. far away from the center plane). In the meantime, the region near the center plane of the composite will inherit the maximum shear force. Therefore, the floorboard manufactured by this invention will combine the characteristics of bamboo and wood materials to meet standard requirements of mechanical and physical properties in the container industry.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

What is claimed is:

1. A method of forming a bamboo-wood composite board, suitable for use as container flooring, comprising the steps of:
   (a) forming a surface layer of bamboo stripe sheets and resin, and hot-pressing the surface layer at a pressure of about 4.0 to about 4.5 MPa such that the surface layer has a specific density of at least about 0.9;
   (b) forming a core layer comprising at least one wood veneer layer and a support layer, wherein the support layer comprises a wood strand layer, and wherein the wood veneer layer continuously extends along the entire width of the board; and
   (c) pressing the surface layer and the core layer together to form the composite board.

2. The method of claim 1 wherein the surface layer is pressed at a temperature of about 135° to about 145° C.

3. The method of claim 2 wherein resin is applied to the hot-pressed surface layer, prior to being pressed together with the core layer.

4. The method of claim 3 wherein the core layer is formed of a wood veneer layer on each side of a wood strand layer.

5. The method of claim 4 wherein the composite board comprises two surface layers.

6. The method of claim 5 wherein the composite board is pressed together at a temperature of about 135° C. to about 145° C., at a pressure of about 1.5 MPa to about 3.0 MPa.

* * * * *